United States Patent [19]
Goff

[11] 3,921,669
[45] Nov. 25, 1975

[54] INTEGRAL POWER STEERING GEAR AND SINTERED METAL VALVE SLEEVE THEREFOR

[75] Inventor: Raymon L. Goff, Lafayette, Ind.

[73] Assignee: TRW Inc., Cleveland, Ohio

[22] Filed: May 10, 1974

[21] Appl. No.: 468,688

Related U.S. Application Data

[63] Continuation of Ser. No. 245,951, April 20, 1972, abandoned.

[52] U.S. Cl.......... 137/625.24; 29/157.1 R; 29/483; 91/375 A; 251/366
[51] Int. Cl.² ........................................ F16K 11/12
[58] Field of Search.............. 91/375 R, 375 A, 467; 251/366, 368, 367; 137/625.21, 625.24; 29/483, 157.1; 403/267, 270, 271, 272

[56] References Cited
UNITED STATES PATENTS

| | | | |
|---|---|---|---|
| 411,637 | 9/1889 | Batchelor et al. | 403/271 X |
| 1,533,099 | 4/1925 | Carroll | 403/267 X |
| 1,558,769 | 10/1925 | Aitken | 74/434 X |
| 2,286,802 | 6/1942 | Herskind | 403/272 X |
| 2,671,539 | 3/1954 | Kiefer | 403/270 |
| 2,841,454 | 7/1958 | Cheramie | 192/67 R |
| 3,033,051 | 5/1962 | Reinke et al. | 91/375 A |
| 3,106,014 | 10/1963 | Brick et al. | 29/483 X |
| 3,379,073 | 4/1968 | Korshak | 29/483 X |
| 3,606,819 | 9/1971 | Venable et al. | 91/375 A |
| 3,707,167 | 12/1972 | Colletti | 91/375 A |

Primary Examiner—Irwin C. Cohen
Attorney, Agent, or Firm—McGlynn and Milton

[57] ABSTRACT

An integral power steering gear in which the valve mechanism comprises a rotary valve including a sintered metal valve sleeve. The valve sleeve is formed of two separate sintered metal elements bonded together to provide a unitary structure. Cooperating and locking and bonding protuberances and recesses are formed on the mating faces of the two elements to include axially extending bonding surfaces which intersect the inner bore of the sleeve. Frequently grooves are formed in the cylindrical bore of the sleeve at the intersection of the abutting surfaces and the bore as the surfaces extend circumferentially or cylindrically about the bore. However, it has been found that such grooves do not occur along the axially extending abutting surfaces and, therefore, the axially extending abutting surfaces prevent leakage.

10 Claims, 16 Drawing Figures

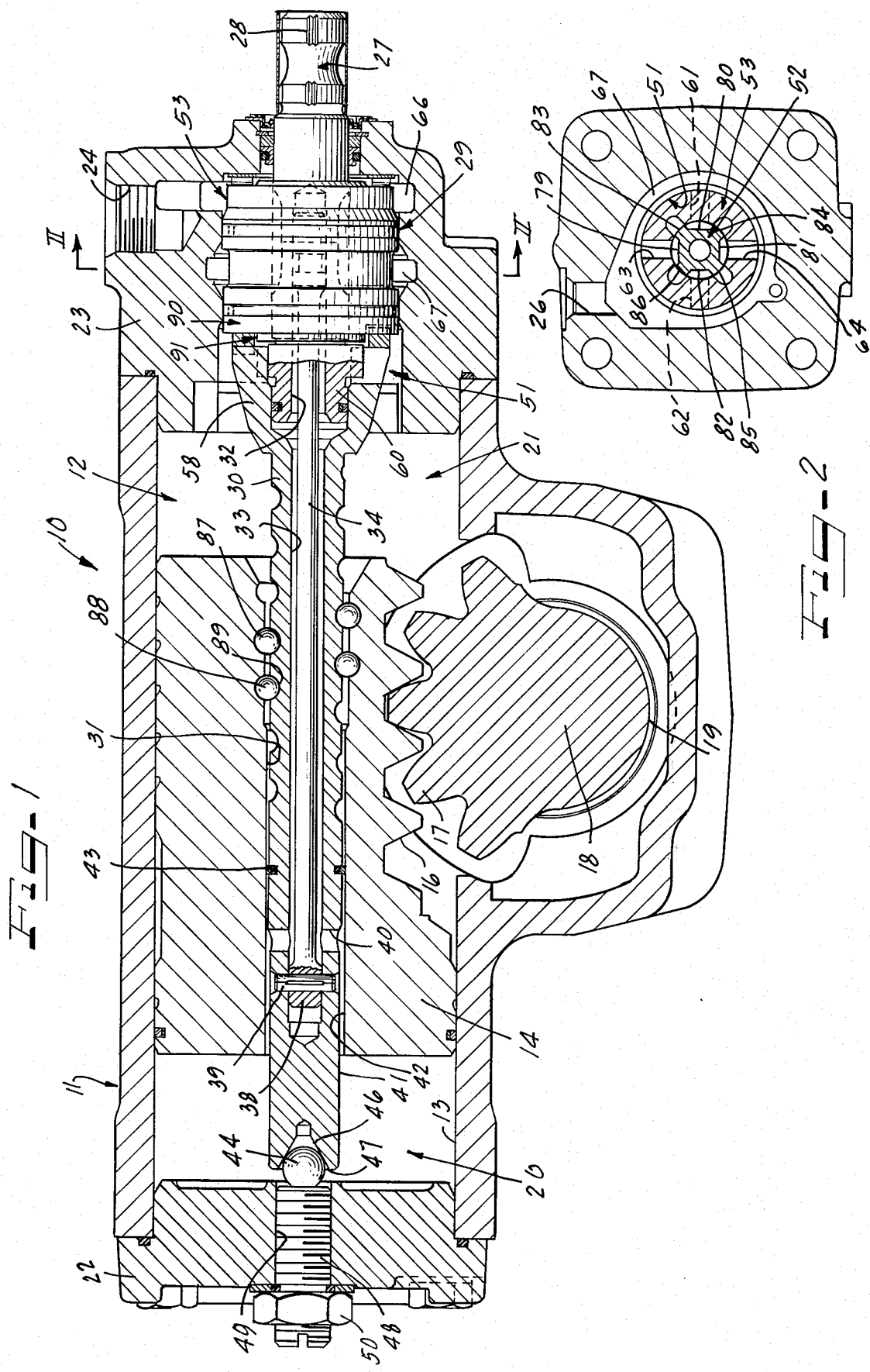

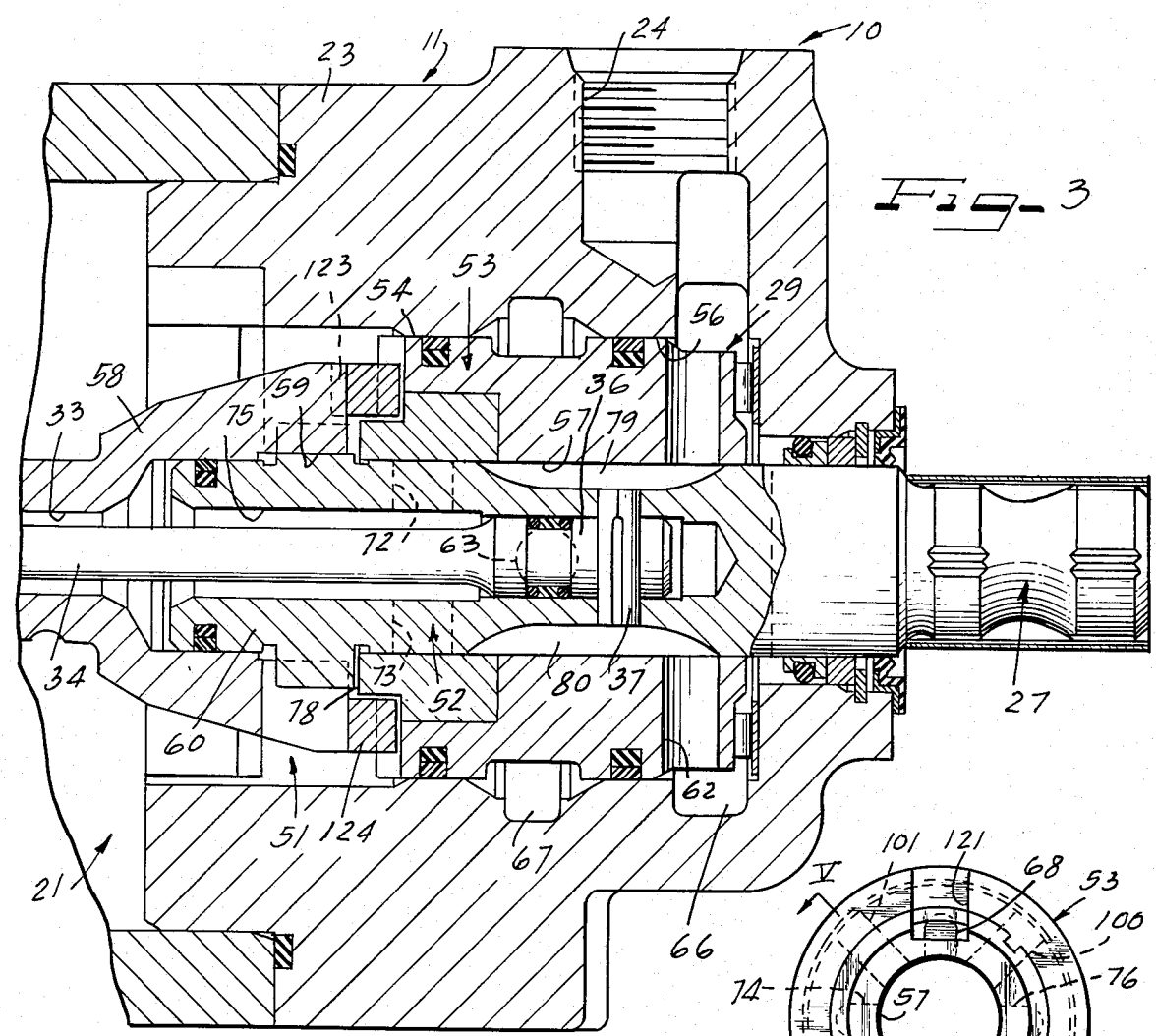

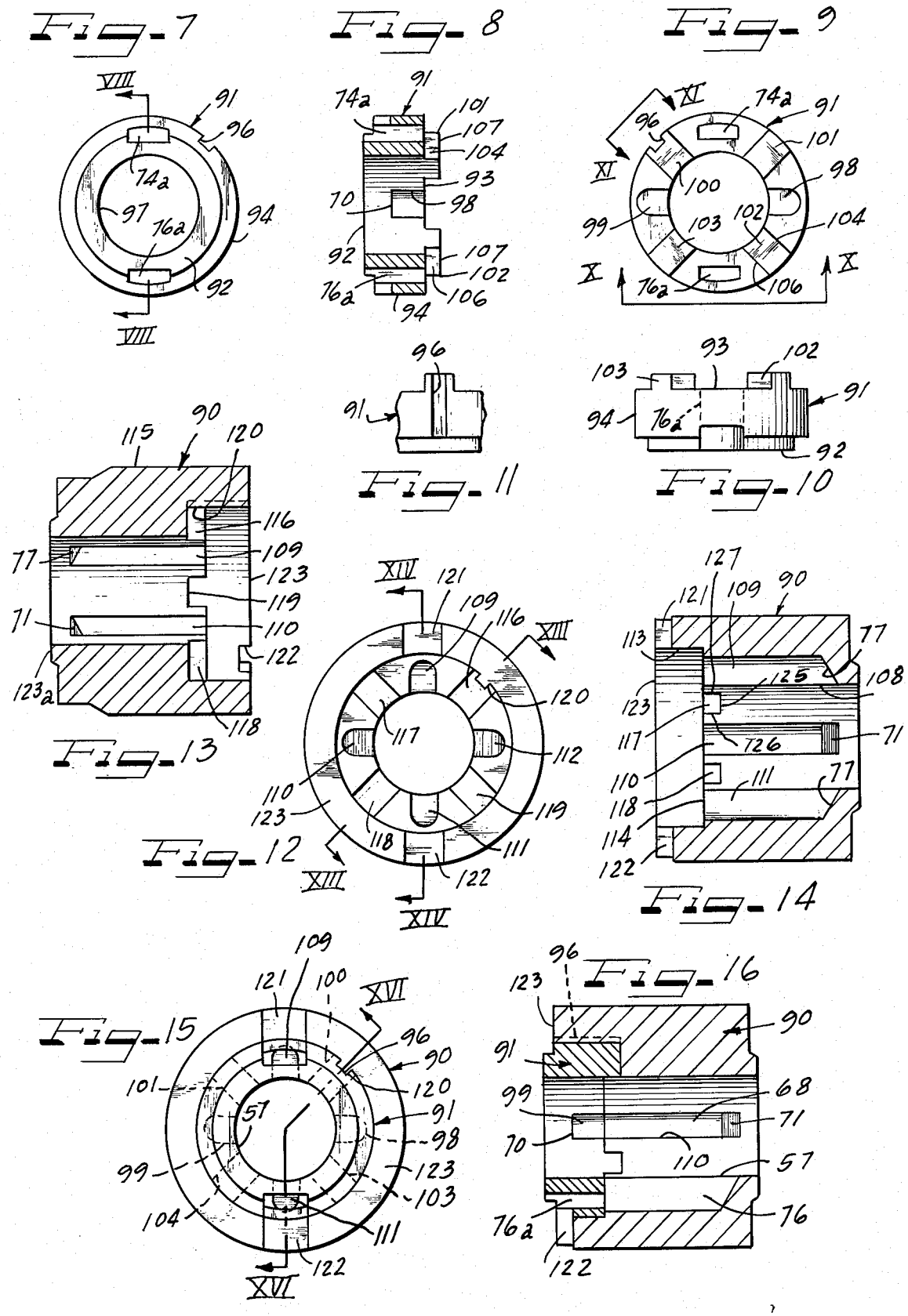

INTEGRAL POWER STEERING GEAR AND SINTERED METAL VALVE SLEEVE THEREFOR

This application is a continuation of co-pending application Ser. No. 245,951, filed Apr. 20, 1972, now abandoned.

BACKGROUND OF THE INVENTION

This invention relates generally to the field of integral power steering gear and more particularly to the valve mechanism used therein for controlling the flow of pressurized fluid between the main power fluid pump with which the steering gear is associated and the opposite ends of the hydraulic cylinder in which the power piston is located.

It will be appreciated as the description of the invention proceeds, however, that a valve mechanism constructed in accordance with the principles of the present invention has utility in other applications and can, in its broadest essence, be advantageously utilized in any application in which a rotary valve is used in performing a valving function.

Integral power steering gear as well as other power steering systems are being widely utilized in controlling the angle of steering of the dirigible wheels of a variety of vehicles including passenger cars, buses, trucks, farm equipment and garden tractors. Regardless of the kind of power steering system involved, all generally include several basic components among which are a main power fluid pump, a hydraulic cylinder, a piston within the cylinder connected to the mechanical steering linkage, a steering shaft and a valve mechanism for controlling the flow of pressurized fluid between the pump and the hydraulic cylinder in response to a turning action of the steering shaft.

In some power steering systems the steering shaft is directly or indirectly mechanically connected to the steering linkage whereby mechanical steering effort is supplemented by hydraulic power whereas in other systems there is no mechanical but instead only a hydraulic connection between the steering shaft and the steering linkage. Likewise in some steering systems the valve mechanism comprises a first valve member which moves axially with respect to a second valve member in performing a valving function whereas in other systems one valve member merely rotates relative to another.

The present invention features a rotary valve mechanism which may be advantageously utilized in many power steering systems but is described herein in association with an integral power steering gear. An integral gear comprises essentially a single housing within which the hydraulic cylinder, the power piston and the valve mechanism are all disposed.

The valve mechanism itself constitutes a modification of the valve mechanism disclosed in Colletti U.S. application Ser. No. 49,708 filed June 25, 1970 entitled "Hydraulic Controller Including Rotary Valve", now U.S. Pat. No. 3,707,167 and the assignee of which is the assignee of the present application. The invention simplifies and reduces the expenses involved in the construction of a valve sleeve by utilizing design criteria heretofore unknown in the art. Since the valve sleeve of a rotary valve mechanism has heretofore represented a major cost item in the complete valve assembly the reductions in cost attributable to the practice of the present invention will enable rotary valve mechanisms to be utilized in applications in which except for cost considerations, they may otherwise be preferred, but in connection with which axially shiftable valve members have heretofore been utilized. Since rotary valve mechanisms are, operationally, more preferable in some applications to an axially shiftable valve mechanism, the present invention, in reducing costs, will permit the rotary valve arrangement to be more widely used when the various design parameters involved indicate a preference for a rotary valve mechanism.

SUMMARY OF THE INVENTION

The present invention may be summarized as comprising a sintered metal valve sleeve for use in a rotary valve mechanism of a power steering system such as an integral power steering gear. In manufacture, the valve sleeve initially comprises two separate valve sleeve elements formed of sintered metal by means of any conventional sintered metal process. After individual formation, the two elements are bonded together by means of a suitable heat treating process to form a unitary structure and are thereafter machined to provide certain circumferential grooves in the peripheral wall.

The foregoing construction and method of manufacture permits the formation of certain flow passages which, because of engineering and production difficulties or the expense involved, could not otherwise be formed.

In addition, the invention involves the formation of certain locking and bonding means which enhances the bond between the two elements, ensures proper alignment thereof and prevents axial twisting therebetween.

Many other features, advantages and additional objects of the present invention will become manifest to those versed in the art upon making reference to the detailed description which follows and the accompanying sheets of drawings in which a preferred structural embodiment incorporating the principles of the present invention is shown by way of illustrative example.

BRIEF DESCRIPTION OF THE DRAWING

FIG. 1 is a sectional view of an exemplary integral power steering gear constructed in accordance with the principles of the present invention.

FIG. 2 is a sectional view taken along lines II—II of FIG. 1.

FIG. 3 is an enlarged view of the right-hand portion of FIG. 1 in which, however, the valve mechanism, shown partially in elevation in FIG. 1, is shown in section as viewed substantially along lines V—V of FIG. 6.

FIGS. 4, 5 and 6 constitute respectively an elevational view, a sectional view and an end view of a valve sleeve included in the valve mechanism shown in FIGS. 1–3.

FIGS. 7–11 are various views of one of the valve sleeve elements shown in FIGS. 4–6, FIGS. 7 and 9 being opposite end views, FIG. 8 being a vertical sectional view taken along lines VIII—VIII of FIG. 7, FIG. 10 being an elevational view taken along lines X—X of FIG. 9 and FIG. 11 being an enlarged fragmentary elevational view taken along lines XI—XI of FIG. 9.

FIGS. 12–14 illustrate another element of the valve sleeve shown in FIGS. 4–6, FIG. 12 being an end view and FIGS. 13 and 14 being sectional views taken respectively along lines XIII—XIII and XIV—XIV of FIG. 12.

FIGS. 15 and 16 are respectively end and sectional views of the valve sleeve of the present invention after the valve sleeve element shown in FIGS. 7–11 has been bonded to the valve element shown in FIGS. 12–14, but before certain machining operations have been performed to produce the final unitary structure shown in FIGS. 4–6.

DESCRIPTION OF THE PREFERRED EMBODIMENT

FIGS. 1–3 illustrate an integral power steering gear, in the art association of which the present invention finds substantial utility. The steering gear is indicated generally at reference numeral 10 and comprises a housing 11 in which is formed a cylinder 12, the cylindrical wall 13 of which slidably carries a power piston 14. On the lower portion of the piston 14 is formed a rack 16 which meshes with the teeth 17 of a sector gear 18.

The gear 18 is formed on a cross shaft 19 which is journalled for rotation on the housing 11 and which has connected thereto for joint rotation therewith a pitman arm or the like adapted for connection to the mechanical steering linkage of the vehicle with which the integral power steering gear 10 is associated. Thus, as the piston 14 is moved back and forth in the cylinder 12 the sector gear 18, the shaft 19 and the pitman arm connected thereto are rotated for controlling the steering of the dirigible wheels of the vehicle.

The piston 14 divides the cylinder 12 into fluid pressure chambers 20 and 21 located at the opposite ends thereof. Pressure chamber 20 is closed by an end wall 22 and pressure chamber 21 is closed by means of an end housing 23.

In order to direct pressurized fluid to and from the pressure chambers 20 and 21 a fluid outlet opening 24 and a fluid inlet opening 26 are formed in the end housing 23 and are adapted for connection to suitable conduits for fluid communication with a main power fluid pump. A steering or operating shaft 27 is journalled for rotation on the end housing 23 and is splined at an outer end 28 thereof for receiving a steering wheel or similar operating member or for connection to an intermediate steering shaft or steering shaft extension. Also located in the end housing 23 is a valve mechanism indicated generally at reference numeral 29, the operation of which controls the flow of fluid between the fluid outlet and inlet openings 24 and 26 and the fluid pressure chambers 20 and 21 in response to a turning action of the steering shaft 27.

Extending from the valve mechanism 29 is a generally cylindrically shaped worm 30 which is axially aligned with the steering shaft 27 and with a cylindrical bore 31 located centrally of and an axial direction through the piston 14 and through which the worm 30 extends.

The steering shaft 27 and the worm 30 are respectively centrally bored as at 32 and 33 to receive a relatively long, slender torsion rod 34, one end 36 of which is connected for joint rotation to the operating shaft 27 by means of a transverse pin 37 and an opposite end 38 of which is connected for joint rotation to the worm 30 by means of a transverse pin 39. The worm 30 is transversely bored at 40 and is slightly reduced in diameter at an outboard end 41 thereof to provide a flow passage 42 between the worm 30 and the bore wall 31. A seal 43 is mounted on the worm 30 inboard of the end portion 41, as a consequence of which pressure chamber 20 is in fluid communication with passage 42, the cross bore 40, the longitudinal bore 33 and the bore 32 of the steering shaft 27, but fluid communication between pressure chambers 20 and 21 is precluded.

The end 41 of the worm 30 is journalled for rotation on a ball bearing 44 which is housing in a V-shaped recess 46 which opens to an end wall 47 of the worm 30. The bearing 44 is formed on the inner end of a threaded stud 48 which is received in a complementarily threaded bore 49 formed in the end cap 22 in axial alignment with the worm 30 and the operating or steering shaft 27. As a result of the threaded relation between the stud 48 and the bore 49 the bearing 44 can be adjusted in an axial direction with respect to the worm 30 and locked in place by means of an adjustment nut 50 which is threaded on the outboard end of the stud 48.

The valve mechanism 29 resides in a chamber 51 formed in the end housing 23 and in fluid communication with which are the fluid inlet and outlet openings 24 and 26. The valve mechanism 29 comprises a cylindrical valve member 52, which is formed integrally with and which is an extension of the operating shaft 27, and a valve sleeve 53 which envelops the valve member 52.

The valve sleeve 53 is generally cylindrically shaped and includes an outer peripheral wall 54, which is journalled for rotation on a bore wall 56 which forms the chamber 51, and an inner peripheral wall 57 which forms a cylindrical bore in which the valve member 52 resides.

The valve member 52 and the valve sleeve 53 are relatively rotatable and in addition the valve sleeve 53 is rotatable relative to the housing 11. On the other hand, the worm 30 is connected for joint rotation to the valve sleeve 53. An enlarged end portion 58 thereof is axially bored as at 59 to receive a distal end portion 60 of the valve member 52.

The valve mechanism 29 is so constructed and arranged that, when the operating shaft 27 is turned in one direction, the valve member 52 is rotated from a neutral position relative to the valve sleeve 53, pressurized fluid is directed from the high pressure inlet 26 to a predetermined one of the pressure chambers 20 and 21, and low pressure fluid is directed from the other pressure chamber to the low pressure fluid outlet 24. Pressurization of one of the pressure chambers 20 and 21 has the effect of hydraulically unbalancing and causing movement of the piston 14 accordingly, which in turn has the effect of rotating the cross shaft 29 and the dirigible wheels to which it is connected. Additionally, axial movement of the piston 14 has the effect of rotating the worm 30 in the same direction of rotation in which the operating shaft 27 was rotated to initiate movement of the piston 14. This rotation of the worm 30 produces a rotational movement of the valve sleeve 53 to "follow up" the prior rotational movement of the operating shaft 27 and the valve member 52. When rotation of the operating shaft 27, and thus the valve member 52 ceases, the continuing "follow up" movement of the valve sleeve 53 will have the effect of returning the valve sleeve 53 back to a neutral position relative to the valve member 52 and interrupting or blocking fluid communication between the fluid inlet opening 26 and the pressurized one of the chambers 20 and 21. Movement of the power piston 14 and of the dirigible wheels to which it is connected through the cross shaft 19 thereupon ceases and ancillarily the follow up movement of the worm 30 and the valve sleeve 53 ceases.

The valve mechanism 29 may be conveniently referred to as a rotary valve mechanism since neither the valve member 52 nor the valve sleeve 53 shifts axially. Instead it is merely relative rotation between the valve member 52 and the valve sleeve 53 which causes the valve mechanism 29 to either establish or block fluid communication between the fluid outlet and inlet openings 24 and 26 and the pressure chambers 20 and 21. The aforementioned U.S. Pat. No. 3,707,167 to Colletti also discloses a rotary valve mechanism in a power steering system.

Referring to FIGS. 3–6, the valve sleeve 53 comprises a pair of radial passages 61 and 62 which are located diametrically opposite one another, and a second pair of diametrically opposite radial passages 63 and 64 which are spaced axially from passages 61 and 62.

Passages 61 and 62 communicate the bore 57 of the valve sleeve 53 with an annular groove 66 which in turn communicates with the pressurized fluid inlet opening 24. The radial passages 63 and 64 communicate with a groove 67 which in turn is in open communication with the fluid outlet opening 26.

In addition, a plurality of axially extending grooves or flow passages are formed in the inner peripheral wall 57 of the valve sleeve 53. Two of the passages identified at reference numerals 68 and 69 terminate in an axial direction well within the axial confines of the valve sleeve 53. Each of the grooves 68 and 69 comprises a pair of end walls 70 and 71, as a consequence of which grooves 68 and 69 communicate at one end with the radial grooves 61 and 62 and at an opposite end with a pair of radial grooves 72 and 73 formed in the inner valve member 52 and communicating with an axial bore 75 formed in the valve member 52.

Another pair of axial grooves 74 and 76 are formed in the inner peripheral wall 57 of the valve sleeve 53. Grooves 74 and 76 are also diametrically opposite one another and are respectively interposed between grooves 68 and 69. Each of the grooves 74 and 76 comprises an end wall 77 so located that each can communicate with radial passages 61 and 62. On the other hand, grooves 74 and 76 cannot communicate with radial passages 72 and 73 of the valve member 52 and instead communicate with axial passages 74a and 76a which open to an end wall 78 of the valve sleeve 53 to communicate with pressure chamber 21 via chamber 51.

To explain the operation of the power steering gear 10 it will be initially assumed that the operating shaft 27 is being held relatively stationarily with respect to the housing 11. The inner valve member 52 formed on the operating shaft 27 is, under those conditions, in a "neutral" position with respect to the valve sleeve 53. This neutral position of the valve member is shown in FIG. 2 in which a series of four axially extending grooves 79, 80, 81 and 82 and lands 83–86 therebetween serve to establish communication between the grooves 68, 69, 74 and 76 of the valve sleeve 53. In the circumstances it will be appreciated that the fluid inlet opening 26 is in direct fluid communication with the fluid outlet opening 24. Since the pressure chambers 20 and 21 are subjected to the same fluid pressure, pressure differential across the piston 14 is essentially zero and the piston itself is at rest.

Assume, however, that the operating shaft 27 is turned in a clockwise direction as viewed in FIG. 1 from the right-hand end thereof. Fluid communication between the fluid inlet opening 24, the high pressure groove 66 and the pressure chamber 21 of the hydraulic cylinder 12 is thereupon established through the grooves 79 and 81 of the valve member 52, grooves 74 and 76 and axial flow passages 74a and 76a of the valve sleeve 53 and the chamber 51 which surrounds the enlarged end portion 58 of the worm 30. Thus the power piston 14 begins to move in a leftward direction as viewed in FIG. 1.

Fluid from the low pressure cylinder 20 communicates with the low pressure groove 67, and thus the fluid outlet opening 26, through the annular chamber 42 surrounding the end portion 41 of the worm 30, the radial passage 40, the axial passage 33 formed in the worm 30 and thence through the bore 32 and the radial passages 72 and 73 formed in the valve member 52 and thence the grooves 68 and 69 formed in the valve sleeve 53.

Leftward movement of the piston 14 causes the worm 30 to rotate in the same clockwise direction as the operating shaft 27 but, of course, the piston will continue to move so long as the operating shaft 27 and valve member 52 are, in a rotational sense, "ahead" of the worm 30 and the valve sleeve 53.

After rotation of the operating shaft 27 and valve member 52 has ceased, the continued follow-up rotation of the worm 30 and the valve sleeve 53 will move the valve sleeve 53 back to a "neutral" relative position relative to the valve member 52, that is, the position shown in FIG. 2. The fluid pressure in the chambers 20 and 21 will then again be balanced and movement of the piston 14 will cease.

Rotation of the operating shaft 27 in a counterclockwise direction will, as a consequence of the valve mechanism 29, have the effect of moving the piston 14 rightwardly as the same is viewed in FIG. 1. Once again, after rotation of the operating shaft 27 ceases, the valve sleeve 53 and the valve member 52 will again be brought into manually neutral positions and the axial movement of the power piston 14 will cease.

The drive connection between the power piston 14 and the worm 30 comprises a series of balls indicated at reference numeral 87 which reside in helically wound cooperating arcuately shaped grooves 88 and 89 formed respectively in the bore wall 31 of the piston 14 and the worm 30. The ball and groove arrangement may be of the recirculating type as will be understood by those skilled in the art. As a consequence of this arrangement axial movement of the piston 14 causes the worm 30 to rotate and conversely, rotation of the worm 30 causes the piston 14 to shift axially.

Referring to FIGS. 4–6, the valve sleeve 53 comprises a pair of valve sleeve elements 90 and 91 which are initially formed individually and of sintered metal and then bonded together in a heat treating process to form a unitary structure. This construction enables the various internal passages of the valve sleeve 53 to be formed in a most economical manner, thus greatly increasing the commercial feasibility of the rotary valve concept.

Referring to FIGS. 7–11, the valve sleeve element 91 is, generally speaking, annularly shaped and comprises a pair of radial end walls 92 and 93 between which the axial fluid flow passages 74a and 76a extend. Formed in an outer peripheral wall 94 is a substantially rectangular recess 96 which, as will be more fully appreciated hereinafter, performs an alignment function with respect to the other valve sleeve element 90.

An inner peripheral wall 97 comprises a portion of the wall of the bore 57 formed in the valve sleeve 53. A pair of diametrically opposite grooves 98 and 99 comprise portions of the grooves 68 and 69 of the valve sleeve 53. It will thus be apparent that a portion of the grooves 68 and 69, which terminate within the axial confines of the valve sleeve 53, are formed in the valve sleeve element 91, whereas the remaining portions thereof are formed in the second valve sleeve element 90.

Extending axially from the radial end wall 93 are a series of equiangularly spaced protuberances or lugs 100–103. In the embodiment illustrated each of the protuberances comprises a pair of spaced parallel axially extending walls 104–106 and a flat radial wall 107 which interconnects the axially extending side walls 104 and 106. As will be appreciated more fully hereinafter, the protuberances 100–103 perform a locking and bonding function between the two valve sleeve elements 90 and 91.

FIGS. 12–14 illustrate the valve sleeve element 90 before circumferential grooves 115a–115d and the radial bores 61–64 shown in FIGS. 4–6 are formed therein. This valve sleeve element is also formed by means of a sintered metal process as a consequence of which various axially extending internal flow passages are formed without any machining operation whatsoever.

As illustrated, the valve sleeve element 90 comprises an inner peripheral wall 108 which forms a portion of the bore wall 57 of the complete valve sleeve 53. Axial grooves 109–112 are formed therein which respectively comprise portions of the grooves 68, 69, 74 and 76.

In addition, the valve sleeve element 90 comprises an enlarged cylindrical bore wall 113 which is substantially of the same diameter of the outer wall 94 of the valve sleeve element 91. A radial wall 114 interconnects the cylindrical walls 108 and 113 and formed therein in axially extending relation are a series of essentially rectangular recesses 116–119 which are arranged in aligned relation to the lugs or protuberances 100–103 extending from the radial wall 93 of the valve sleeve element 91. In addition, an axially extending land or ridge 120 is provided within the recess 116 in cooperating relation with the recess 96 formed in the outer wall 94 of the valve sleeve element 91.

In order to connect the valve sleeve element 90 and the enlarged end portion 58 of the worm 30 for joint rotation, a pair of recesses 121 and 122 are formed in a radial end wall 123 of the valve sleeve element 90. As shown in FIG. 3, a pair of lugs 123 and 124 project axially from the worm end portion 58 and are snugly received in the recesses 121 and 122 to provide a joint driving connection therebetween.

To provide a unitary valve sleeve 53, the valve sleeve element 91 is telescopically inserted into the cylindrical wall 113 of the valve sleeve element 90 as shown in FIGS. 15 and 16. There may be provided a very slight interference fit between the outer wall 94 of the valve sleeve element 91 and the cylindrical wall 113. In any event, these two wall surfaces, after physical assembly, are disposed in abutting relation with one another. Furthermore, the axially extending side walls 104 and 106 and the radial wall 107 of each of the protuberances 100–103 of the valve sleeve element 91 are disposed in abutting relation and are snugly matched with respect to the corresponding walls 125, 126 and 127 of the recesses 116–119 formed in the radial wall 114 of the valve sleeve element 90.

After the valve sleeve elements 90 and 91 are physically interconnected and assembled as shown in FIGS. 15 and 16 they are subjected to a suitable heat treating process for actually physically bonding the abutting surfaces thereof to form a unitary structure. The appropriate heat treating process will, of course, depend upon the particular kind of sintered metal being used, as will be understood by those skilled in the art. Heat treating the two assembled elements 90 and 91, however, provides a molecular bond between the abutting surfaces of the sintered metal elements and as a consequence the final structure may be considered for all practical purposes as a single, unitary, monolithic valve sleeve.

The recess 96 formed in the outer wall 94 of the valve sleeve element 91 and the land 120 formed in the valve sleeve element 90 are provided to afford easy assembly of elements 90 and 91 in proper angular alignment. The protuberances 100–103 of the valve sleeve element 91 and the corresponding recesses 116–119 of the valve sleeve element 90 together strengthen and preclude relative twisting of the elements 90 and 91 and further assist in providing an exceptional bond between the two elements.

For example, in addition to the provision of the cylindrical abutting surfaces 94 and 113 and the radial surfaces 93 and 114, there is also provided axially, radially and circumferentially abutting and mating surfaces between the various walls of the lugs 100–103 and the recesses 116–119. There are therefore provided bonding surfaces which are not only essentially circumferential and radial in direction, but also axial. The additional locking and bonding effects of the protuberances 100–103 and the recesses 116–119 enable the two-element sintered metal valve sleeve 53 to be utilized with high reliability as though it were a single unitary structure. The bond between the elements 90 and 91 is excellent as a consequence of the three dimensional aspect of the various abutting and bonding surfaces and axial twisting between the elements 90 and 91 is precluded by virtue of the locking effect of the protuberances 100–103 and the recesses 116–119.

After the valve sleeve 53 has been formed into the single structure shown in FIGS. 15 and 16, various O-ring grooves and the like are machined in the outer wall thereof as shown in FIGS. 4 and 5. The formation of such grooves, of course, does not particularly lend itself to the sintered metal process.

Nevertheless, the valve sleeve 53 formed of the two sintered metal valve sleeve elements 90 and 91 and having the various axial flow passages formed therein is manufactured much more economically in accordance with the principles of the present invention than could otherwise be accomplished by more conventional methods of manufacture. The overall strength of the valve sleeve 53 is enhanced by the provision of the protuberances 100–103 and the recesses 116–119 and of course the assembly of the two valve sleeve elements 90 and 91 is enhanced by the provision of the cooperating alignment groove 96 and land 120.

Although minor modifications might be suggested by those versed in the art, it should be understood that I wish to embody within the scope of the patent warranted hereon all such modifications as reasonably come within the scope of my contribution to the art.

I claim:

1. A valve assembly including a valve sleeve comprising first and second valve elements formed of sintered metal and physically bonded together in abutting end-to-end relationship to define a unitary valve structure having generally cylindrically shaped inner and outer peripheral wall surfaces forming the inner and outer peripheral confines of said valve sleeve, a pair of first and second axially extending fluid flow passages opening into said inner peripheral wall surface, said first and second passages being spaced circumferentially about said inner peripheral wall surface, said first and second valve elements having interlocking abutting ends which include a plurality of cooperating abutting and generally axially extending bonding surfaces intersecting said inner peripheral wall surface and circumferentially spaced between said first and second passages.

2. An assembly as set forth in claim 1 wherein said axially extending bonding surfaces are defined by interlocking lug and recess means formed on the abutting ends of said valve elements.

3. An assembly as set forth in claim 2 wherein said interlocking lug and recess means comprises additional cooperating and abutting wall surfaces extending circumferentially and radially with respect to the axis of said valve sleeve.

4. An assembly as set forth in claim 3 including means defining cooperating axially extending radially angularly aligned alignment rib and groove means on said valve elements.

5. An assembly as set forth in claim 1 wherein said first passage extends into both of said first and second valve elements whereby said abutting ends of said valve elements meet along said first passage.

6. An assembly as set forth in claim 1 including a cylindrically-shaped valve member having a plurality of axially extending grooves formed in the periphery thereof and rotatably disposed within said valve sleeve whereby said grooves in said valve member cooperate with said passages in said sleeve to perform a valving function.

7. An assembly as set forth in claim 1 wherein said first valve element includes an enlarged cylindrical bore extending into one end thereof, said second valve element being disposed in said bore.

8. An assembly as set forth in claim 7 including means defining cooperating axially extending radially angularly aligned alignment rib and groove means on said valve elements between said bore and the outer circumference of said second valve element.

9. An assembly as set forth in claim 7 wherein said second passage terminates at the bottom of said cylindrical bore and including an axial fluid passage extending from said second passage through said second valve element to the end of said sleeve.

10. An assembly as set forth in claim 9 wherein said first passage extends into both of said first and second valve elements whereby said abutting ends of said valve elements meet along said first passage.

* * * * *